Figure 1:
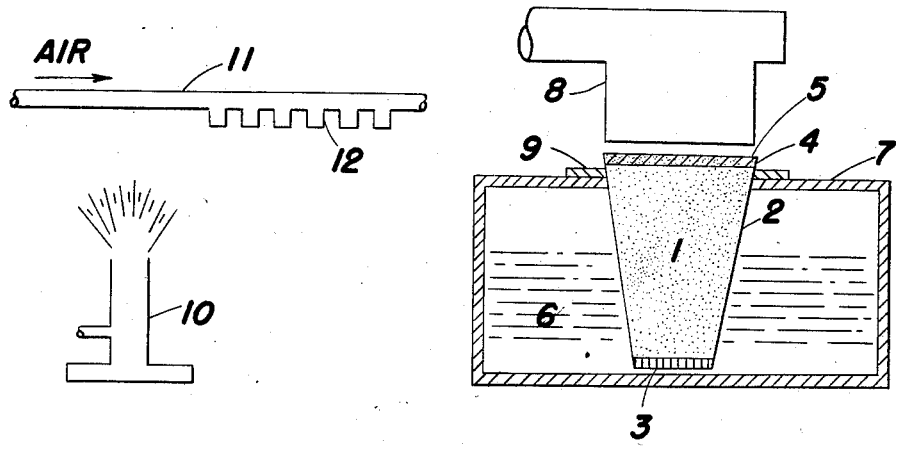

Oct. 19, 1948.   N. P. STEVENS ET AL   2,451,885
GEOCHEMICAL PROSPECTING
Filed Jan. 11, 1946

Nelson P. Stevens
Rodney M. Squires
INVENTORS

BY John L. Sullivan
AGENT

Patented Oct. 19, 1948

2,451,885

UNITED STATES PATENT OFFICE 2,451,885

GEOCHEMICAL PROSPECTING

Nelson P. Stevens, Dallas, and Rodney M. Squires, Alice, Tex., assignors, by mesne assignments, to Socony-Vacuum Oil Company, Incorporated, New York, N. Y., a corporation of New York Application January 11, 1946, Serial No. 640,593

11 Claims. (Cl. 250—71)

The present invention is directed to an improved method of measuring the fluorescence of soils as an indication of the proximity of petroliferous deposits.

In a previous application, Serial No. 624,563, filed October 25, 1945, by Rodney M. Squires, one of us, there is disclosed and claimed a method of measuring soil fluorescence in which the soil sample is treated with an organic solvent in a manner such that organic constituents of the soil, significantly related to petroliferous deposits, are extracted therefrom and concentrated on a restricted portion of the sample surface prior to measuring the fluorescence of the sample. As disclosed in that application, this treatment has the effect of greatly increasing the magnitude of the fluorescence values obtained so that anomalous variations in fluorescence from sample to sample are more clearly defined.

In a second application, Serial No. 627,487, filed November 8, 1945, by the present inventors, there is disclosed and claimed an improved method for determining soil fluorescence in which the fluorescence values are corrected by taking into account the non-significant "inorganic" fluorescence of the soil. By the method of this latter application, two measurements of the fluorescence are conducted, the first, prior to the solvent treating step mentioned hereinabove, and the second after said treating step. The first value, which is representative of the "inorganic" fluorescence, is subtracted from the value obtained in the second, or "total," fluorescence measurement, to derive the "organic" fluorescence of the sample.

It is an object of this invention to provide means for determining the "organic" fluorescence of the soil without the necessity of conducting two fluorescence measurements on each sample. Another object is to provide means whereby the variation in the "inorganic" fluorescence from sample to sample is eliminated and the significant "organic" fluorescence values for each of the soil samples are determined by means of a single fluorescence measurement. Other and further objects of the invention will become apparent from the following description thereof taken in connection with the accompanying drawing.

We have now found that the "inorganic," or background, fluorescence values for any series of soil samples may be conveniently maintained constant by employing a thin layer of material to cover the otherwise normally exposed surface of each sample for the fluorescence test. The sample is then subjected to the organic solvent treatment, so as to deposit the organic constituents of the sample on the surface of the covering material. This covering material is hereinafter referred to as the "carrier" layer. After the deposition of the organic constituents of the sample on the "carrier" layer surface, the fluorescence of this surface is then determined as the significant "organic" fluorescence of the sample. In this way, differences in the non-significant "inorganic," or background, fluorescences of the samples are automatically eliminated, since the fluorescence of the carrier layer is constant.

A wide variety of substances are suitable for use as the carrier layer of our invention. Thus, any solid granular material of substantially uniform composition and color, which is substantially non-fluorescent in character and which is free from contamination with organic matter will serve the purpose of the invention. We have found, for example, that such substances as granulated sugar, finely divided silica gel or fine grained quartz sand, provide highly satisfactory results.

In practicing the invention, the collected soil samples whose fluorescences are to be determined are dried, crushed, and screened to suitably reduce their particle size. The crushed sample may be passed through a suitably fine screen, for example, about 30 mesh, to provide the necessary uniformity of particle size. Each sample is then placed in a vessel large enough to hold the amount of sample ordinarily required for the purpose of the method, i. e., from 25 to 50 grams. This vessel should have an opening whose cross-sectional area is relatively small compared to its total enclosed wall area. This will allow only a relatively small fixed portion of the potential surface area of the sample to be exposed to the atmosphere when the vessel is filled with sample. The exposed surface of the sample is then covered by a layer of "carrier" material of about 1 or 2 mm. in thickness. This carrier layer should have a relatively small particle size, preferably below about 50 mesh. A predetermined volume of organic solvent is then added to the sample vessel in the manner hereinafter described. The amount of solvent employed should be sufficient to saturate the soil sample as well as the carrier layer. The solvent is then removed from contact with the sample by evaporating it from the surface of the carrier layer. This is accomplished by maintaining the partial pressure of the solvent in the atmosphere adjacent to the carrier layer surface substantially below the normal vapor pressure of the solvent, as by passing a gentle stream of heated air over this surface. The evaporation of solvent from the surface of the carrier layer produces an upward movement of the liquid solvent, containing extracted organic materials, from the body of the sample to the surface of the carrier layer where they are deposited upon evaporation of the solvent. Eventually all of the solvent will be evaporated, leaving a thin, even layer of organic residue on the surface of the carrier layer. The fluorescence of this surface which represents the significant organic content of the sample is then measured. The fluorescence values thus obtained for the different samples are then correlated in relation to the respective sampling sites in the manner well known in order to obtain the desired indications relative to the possible presence of a petroliferous deposit.

A complete understanding of the nature of our invention and the manner of operation thereof may be had by referring to the accompanying drawings in which suitable apparatus for conducting the invention is diagrammatically illustrated.

Referring to Figure 1 of the drawings, there is shown a soil sample 1 which has been dried and its particle size reduced to pass a 30 mesh screen, after which treatment it is placed in a suitable vessel 2 having a perforated bottom 3, such as a Gooch crucible. The amount of sample placed in the vessel should be such that the vessel is almost, but not completely, filled, so that a sufficient space is provided at the top of the vessel for the carrier layer 4. The weight of sample used in each instance is accurately determined. The carrier layer, which is preferably about 1 or 2 mms. thick, is leveled off even with the edge of the sample vessel to provide a smooth surface 5 for deposition of the extracted organic materials thereon and for subsequent exposure to the fluorescence test. The sample is now ready for the next step of the invention, viz. treatment of the sample with an organic solvent to extract the organic constituents thereof and deposit them on the surface of the carrier layer. To accomplish this step, a predetermined amount of solvent 6, such as carbon tetrachloride, chloroform, or the like, is placed in a container 7. The sample vessel is then set into container 7, which is provided with an opening in the top thereof to receive the sample vessel. The diameter of this opening is somewhat smaller than the upper portion of the sample vessel, so that the vessel wall fits snugly against the container opening. It will be seen from the drawing that when the sample vessel is in place in the container the bottom of the vessel is immersed in the solvent and that it comes close to, but does not touch, the bottom of the container. This allows the solvent to enter the sample vessel from the container via the holes in the bottom 3 thereof. The solvent rises through the sample by capillary action, saturating the sample and extracting the organic substances contained therein.

The container and sample vessel arranged as above described are placed beneath an air jet 8 from which a stream of warm air is gently passed in contact with the surface 5 of the carrier layer. A suitable collar 9 is tightly fitted to the wall of the sample vessel at the edge of the container opening to form a substantially vapor-tight seal between the vessel wall and the container opening so that evaporation of the solvent around the edge of the container opening is prevented. The temperature of the atmosphere adjacent the surface 5 is maintained substantially constant by the warm air from the jet 8 at a value above that which will cause appreciable vaporization of the solvent from this surface, but below that which would cause vaporization or decomposition of the significant organic substances extracted from the soil. Preferably, the temperature is maintained below the boiling point of the solvent employed. For example, where carbontetrachloride is employed, a satisfactory temperature is about 30° C. The air may be heated by any suitable means, such as a burner 10, as it passes through the conduit 11. The conduit 11 may desirably have several or more jets 12, for simultaneous treatment of a plurality of samples. The warm air passing over the carrier layer surface induces relatively rapid evaporation of the volatile solvent material from the surface 5 which in turn causes the solvent in the vessel 2 to percolate up through the body of the sample, additional solvent being drawn into the sample vessel from container 7 through the bottom 3 of the sample vessel. The solvent, rising through the sample, carries the significant organic substances which have been extracted and leached from the sample. As the solvent is evaporated into the atmosphere, these organic substances which are not volatile at the temperature of the solvent evaporation are deposited on the carrier layer surface. When the solvent is substantially completely evaporated, a thin, even layer of organic residue will be deposited on this surface. The solvent should be vaporized as completely as practically possible from the surface of the carrier layer, although minor amounts may remain adsorbed or otherwise retained in the body of the sample. After the significant organic substances have thus been concentrated on the sample surface, the fluorescence of this surface is measured as the significant "organic" fluorescence of the sample.

Figure 2:
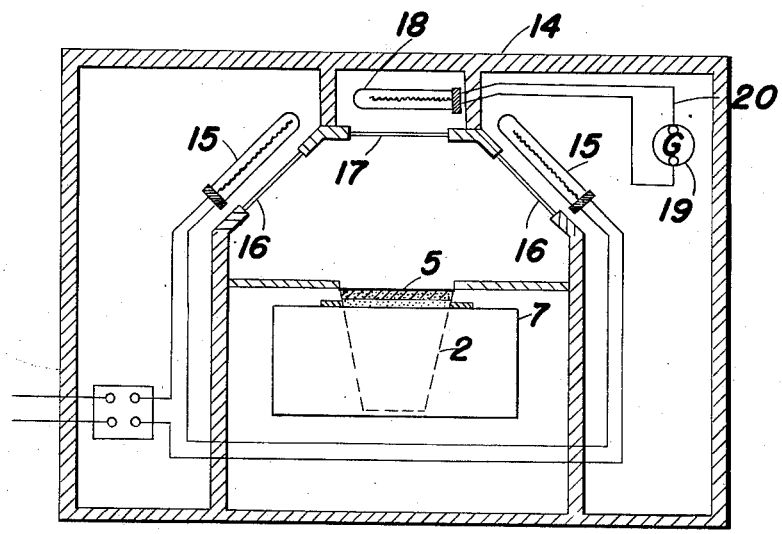

Referring to Figure 2, to conduct the fluorescence measurement, the container 7, having the sample vessel 2 set therein, is placed in position in fluorimeter box 14. The fluorimeter box is closed and the surface 5 is irradiated with ultraviolet light by suitable means, such as Mineralight quartz mercury vapor lamps 15. Suitable filters 16, such as Corex 9863, are disposed between the light source and the surface 5 to absorb substantially all of the visible light. Another filter 17 is placed between the sample and the detector 18 to reduce further the amount of visible light emitted by the source and reflected by the carrier layer surface. This filter also serves to isolate selected portions of the visible fluorescent spectrum. A suitable filter for this purpose is a Corning No. 3486, which cuts out wave lengths below 0.5 microns. The detector 18 may be a high vacuum electron multiplier photo-tube, such as an RCA No. 931A, the intensity of the output current of which is a linear function of the exciting illumination. The output is measured using a spotlight galvanometer 19 connected to the detector tube through the circuit 20.

Although a number of different types of vessels may be used for holding the soil sample, we have found a No. 3 Gooch crucible to be convenient and highly satisfactory for the purpose. In any case, the vessel used should be of a shape such that the ratio of the volume of sample treated to area of carrier layer surface exposed for the deposition of extracted soil constituents thereon is at least about 2½ to 1 in order to effect the desired increase in the magnitude of the fluorescence values. For example, where the cross-sectional area of the area of the vessel opening for exposure of the carrier layer surface is 10 cms.$^2$, the volume of the vessel should be approximately 25 cms.$^3$, if satisfactory results are to be obtained. Since the amount of sample taken for treatment is that required to fill the sample vessel (except for the space reserved for the carrier layer), when using a No. 3 Gooch crucible, this amount of sample, ground to 30 mesh, will weigh in the neighborhood of from 30 to 35 grams. We have found as a general rule that substantially complete extraction of the organic constituents of this amount of sample by our method requires the use of about 50 cc. of solvent, although a greater or lesser amount may be employed where it is felt desirable to do so. However, to make the fluorescence values properly comparable, a constant amount of solvent should be used for the treatment of all the samples in a particular survey.

Another factor which exerts a significant effect upon the magnitude of the fluorescence values obtained by our method is the area of carrier layer surface exposed for the fluorescence test. Thus, the smaller this surface is (i. e., within practical limits) the greater will be the intensity of fluorescence per unit area thereof. However, by our method this area is conveniently maintained constant for all of the samples tested by the use of a standard sized crucible, so that no correction for variation in this surface area from sample to sample is necessary. By our method then, only one correction factor need be applied to the fluorescence values, viz., a correction for the weight of sample used in each case. Thus, since the weight of sample taken in each instance is for convenience that required to almost fill the crucible, this weight will vary somewhat from sample to sample; the intensity of fluorescence being affected accordingly, so that the fluorescence values should be corrected to same standard weight of sample. We have found it convenient for this purpose to correct the fluorescence values to a value equivalent to 100 grams of sample in each case.

After the fluorescence values have been obtained and corrected on the basis of the weight of sample treated, as described above, they are correlated in relation to the respective sampling locations by any of the well known methods in order to detect possible anomalies indicative of the presence of a petroliferous deposit. For example, the values may be plotted as a function of sampling site where the samples were taken from points located on a traverse or a plurality of traverses in a prospect area, or, where the samples have been collected from sampling points set out according to some different plan or pattern, the results of the fluorescence measurements may be correlated by locating them with respect to the respective sampling points on a map of the survey area.

Obviously the fluorescence values obtained by our method are purely relative with respect to the concentration of significant fluorescent organic materials in the soil; however, only relative values are required for the success of the method, since they are directly proportional to the concentration of significant organic materials in the soil.

It will be evident to those skilled in the art that the method of our invention provides several distinct advantages over the prior art methods for measuring the fluorescence of soils in relation to petroleum deposits. Thus, the solvent used in our method need not be nonfluorescent in character, since the fluorescence measurements are not conducted on solvent extract solutions but on the carrier layer surfaces. Also our method provides a means of correcting for the inorganic fluorescence of the soil without the necessity of conducting more than one fluorescence measurement.

Although we have indicated the use of a particular form of apparatus and mentioned specific substances to be suitable for use as the solvent material or the carrier layer of our invention, it should be understood that the invention is not to be construed as limited to the use of the apparatus or materials so mentioned, but only as indicated in the appended claims.

Having now fully described our invention, what we claim as new and useful and wish to secure by Letters Patent is:

1. The method of determining the fluorescence of a soil sample which comprises the steps of placing said sample in a vessel adapted to expose a relatively small portion of the potential surface of said sample to the atmosphere, covering said exposed surface with a layer of granulated material which is substantially free of organic matter and which is substantially non-fluorescent in character, adding a predetermined amount of an organic solvent to the sample vessel to contact the sample and said granular material to extract organic constituents of said sample, removing the solvent from contact with said sample and said granular material by evaporating it from the surface of said material under conditions such that the desired, indicative portion of the extracted soil constituents are not vaporized along with the solvent but are deposited on the surface of said covering layer as the solvent is evaporated and measuring the fluorescence of the surface of said layer after the solvent has been practically completely removed from said sample and said layer.

2. The method of treating a sample of soil preparatory to measuring its fluorescence as an indication of the proximity of a petroleum deposit to the sampling site which comprises placing a known quantity of the sample in a vessel having an opening adapted to expose a fixed area of sample surface to the atmosphere, said area being relatively small compared to the potential surface area of the sample, providing a thin layer of finely divided material of substantially uniform particle size and of negligible fluorescence, to cover said sample surface, adding a predetermined amount of organic solvent to said vessel to soak said sample and said layer and extract organic constituents from said sample, removing said solvent from said sample by warming the atmosphere adjacent the surface of said covering layer whereby said organic solvent is evaporated from the surface of said layer and whereby said evaporation initiates movement of solvent solution from the body of the sample to said covering layer, continuing to evaporate said solvent from the surface of said covering layer until said solvent has been substantially completely removed from contact with the sample and said covering layer and vaporized, whereby the extracted organic materials not appreciably vaporizable at the temperature maintained adjacent said covering layer are deposited on the surface of said layer upon evaporation of said solvent therefrom, and thereafter measuring the fluorescence of the surface of said layer.

3. The method of determining the significant organic fluorescence of a soil sample which comprises placing a known quantity of said sample in a vessel having an opening adapted to expose a fixed area of sample surface to the atmosphere, said fixed area being relatively small compared to the total potential surface area of said sample, covering said surface area with a thin layer of graduated, hydrocarbon-free, substantially non-fluorescent material, adding a predetermined amount of an organic solvent to said vessel to soak said sample and said layer, whereby organic constituents of the soil are extracted from said sample by solution in said solvent, removing the solvent from contact with said sample and said layer by maintaining the temperature of the atmosphere adjacent the surface of said covering layer at a level sufficiently high so that said solvent is evaporated at the surface of said layer but below the boiling point of said solvent and sufficiently low to avoid decomposition of the organic constituents extracted from said sample by said solvent, said vaporization causing the extract solution formed by the action of the solvent in contact with the body of the sample to percolate upwards toward the surface of said covering layer, continuing to evaporate said solvent from said surface until the solvent has thus been substantially completely removed from the sample and the covering layer, whereby organic constituents extracted by said solvent, but not vaporizable at the temperature maintained at the surface of the covering layer, are deposited on the surface of said layer and measuring the fluorescence of said surface as the significant organic fluorescence of the soil sample.

4. A method of prospecting for buried petroliferous deposits which comprises collecting a number of soil samples from spaced sites in a prospect area, placing a known weight of each sample in a vessel having an opening adapted to expose a fixed surface area of the sample to the atmosphere, spreading a layer of granular, substantially non-fluorescent, hydrocarbon-free material over said surface so that it is no longer exposed but is covered by said layer, adding a predetermined amount of an organic solvent to said vessel to saturate said sample and said covering layer, whereby organic constituents are extracted from said sample by solution in said solvent, removing the solvent from contact with said sample and said layer by vaporizing it from the surface of said layer, said vaporization inducing a movement of the liquid extract solution, formed by the action of the solvent in contact with the body of the sample, upwards through said sample to the surface of the covering layer, continuing to evaporate said solvent from said surface until substantially all of solvent has thus been removed from contact with the sample and covering layer and vaporized, whereby the extracted organic constituents of said sample, not appreciably vaporizable at the temperature maintained at the covering layer surface, are deposited on said surface, measuring the fluorescence of said covering surface and comparing the fluorescence values so obtained for the different samples in relation to the respective sampling sites on the basis of the weight of sample employed in each case to derive indications as to the presence of a sought deposit.

5. A method of prospecting for buried petroliferous deposits which comprises collecting a number of soil samples from spaced sites in a prospect area, placing a known weight of each sample in a vessel having an opening adapted to expose a fixed surface area of the sample to the atmosphere, spreading a layer of granulated sugar over said surface so that it is no longer exposed but is covered by said layer, adding a predetermined amount of an organic solvent to said vessel to saturate said sample and said covering layer, whereby organic constituents are extracted from said sample by solution in said solvent, removing the solvent from contact with said sample and said layer by vaporizing it from the surface of said layer, said vaporization inducing a movement of the liquid extract solution, formed by the action of the solvent in contact with the body of the sample, upwards through said sample to the surface of the covering layer, continuing to evaporate said solvent from said surface until substantially all of solvent has thus been removed from contact with the sample and covering layer and vaporized, whereby the extracted organic constituents of said sample, not appreciably vaporizable at the temperature maintained at the covering layer surface, are deposited on said surface, measuring the fluorescence of said covering surface and comparing the fluorescence values so obtained for the different samples in relation to the respective sampling sites on the basis of the weight of the sample employed in each case to derive indications as to the presence of a sought deposit.

6. A method of prospecting for buried petroliferous deposits which comprises collecting a number of soil samples from spaced sites in a prospect area, placing a known weight of each sample in a vessel having an opening adapted to expose a fixed surface area of the sample to the atmosphere, spreading a layer of finely divided silica gel over said surface so that it is no longer exposed but is covered by said layer, adding a predetermined amount of an organic solvent to said vessel to saturate said sample and said covering layer, whereby organic constituents are extracted from said sample by solution in said solvent, removing the solvent from contact with said sample and said layer by vaporizing it from the surface of said layer, said vaporization inducing a movement of the liquid extract solution, formed by the action of the solvent in contact with the body of the sample, upwards through said sample to the surface of the covering layer, continuing to evaporate said solvent from said surface until substantially all of solvent has thus been removed from contact with the sample and covering layer and vaporized, whereby the extracted organic constituents of said sample, not appreciably vaporizable at the temperature maintained at the covering layer surface, are deposited on said surface, measuring the fluorescence of said covering surface and comparing the fluorescence values so obtained for the difference samples in relation to the respective sampling sites on the basis of the weight of sample employed in each case to derive indications as to the presence of a sought deposit.

7. A method of prospecting for buried petroliferous deposits which comprises collecting a number of soil samples from spaced sites in a prospect area, placing a known weight of each sample in a vessel having an opening adapted to expose a fixed surface area of the sample to the atmosphere, spreading a layer of fine grained quartz over said surface so that it is no longer exposed but is covered by said layer, adding a predetermined amount of an organic solvent to said vessel to saturate said sample and said covering layer, whereby organic constituents are extracted from said sample by solution in said solvent, removing the solvent from contact with said sample and said layer by vaporizing it from the surface of said layer, said vaporization inducing a movement of the liquid extract solution, formed by the action of the solvent in contact with the body of the sample, upwards through said sample to the surface of the covering layer, continuing to evaporate said solvent from said surface until substantially all of solvent has thus been removed from contact with the sample and covering layer and vaporized, whereby the extracted organic constituents of said sample, not appreciably vaporizable at the temperature maintained at the covering layer surface, are deposited on said surface, measuring the fluorescence of said covering surface and comparing the fluorescence values so obtained for the different samples in relation to the respective sampling sites on the basis of the weight of sample employed in each case to derive indications as to the presence of a sought deposit.

8. In a method of prospecting for subterranean petroliferous deposits in which the fluorescence value of soil samples collected at selected sites in a prospect area are measured and compared as an indication of the proximity of a sought deposit the steps which comprise placing a known quantity of sample in a vessel having an opening adapted to expose a constant relatively small portion of the potential total surface of the sample and provided with at least one opening for the entrance of a liquid below said first opening, covering the exposed sample surface with a thin layer of a granular, hydrocarbon free, non-fluorescent material, contacting the liquid opening with a predetermined volume of a liquid organic solvent, removing the solvent from contact with said sample and said granular material by evaporation from the surface of said thin layer of granular material under conditions such that the indicative portion of the solvent extracted soil constituents is not vaporized, whereby the fluorescent material contained in the soil samples are uniformly concentrated on the granular surface layer for measurement.

9. The process of claim 8 in which the granular covering material is sugar.

10. The process of claim 8 in which the granular covering material is finely divided silica gel.

11. The process of claim 8 in which the granular covering material is fine grained quartz particles.

NELSON P. STEVENS.
RODNEY M. SQUIRES.

REFERENCES CITED

The following references are of record in the file of this patent:

UNITED STATES PATENTS

| Number | Name | Date |
|---|---|---|
| Re. 22,081 | Campbell | Apr. 28, 1942 |
| 2,305,082 | Hocott | Dec. 15, 1942 |
| 2,337,443 | Blau | Dec. 21, 1943 |

Certificate of Correction

October 19, 1948.

Patent No. 2,451,885.

NELSON P. STEVENS ET AL.

It is hereby certified that errors appear in the printed specification of the above numbered patent requiring correction as follows:

Column 7, line 6, claim 3, for the word "graduated" read *granulated*; column 8, line 57, claim 6, for "difference" read *different*; and that the said Letters Patent should be read with these corrections therein that the same may conform to the record of the case in the Patent Office.

Signed and sealed this 7th day of June, A. D. 1949.

[SEAL]

THOMAS F. MURPHY,
*Assistant Commissioner of Patents.*